United States Patent
Razzell

(10) Patent No.: US 8,340,599 B2
(45) Date of Patent: Dec. 25, 2012

(54) SWEPT NOTCH ULTRA WIDE BAND (UWB) TRANSMITTER

(75) Inventor: Charles Razzell, Pleasanton, CA (US)

(73) Assignee: NXP B.V., Eindhoven (NL)

( * ) Notice: Subject to any disclaimer, the term of this patent is extended or adjusted under 35 U.S.C. 154(b) by 1241 days.

(21) Appl. No.: 12/095,559

(22) PCT Filed: Dec. 1, 2006

(86) PCT No.: PCT/IB2006/054561
§ 371 (c)(1),
(2), (4) Date: May 30, 2008

(87) PCT Pub. No.: WO2007/063528
PCT Pub. Date: Jun. 7, 2007

(65) Prior Publication Data
US 2010/0184391 A1    Jul. 22, 2010

Related U.S. Application Data

(60) Provisional application No. 60/741,856, filed on Dec. 2, 2005.

(51) Int. Cl.
*H04B 1/04* (2006.01)

(52) U.S. Cl. .................... 455/114.2; 375/295

(58) Field of Classification Search ............ 455/63, 455/1, 67.11, 114.1, 114.2, 114.3, 115.1, 455/126; 375/142, 150, 295, 296
See application file for complete search history.

(56) References Cited

U.S. PATENT DOCUMENTS

| 7,079,604 B1 * | 7/2006 | Miller et al. ............ 375/142 |
| 7,697,630 B2 * | 4/2010 | McCorkle ............... 375/295 |
| 2002/0004377 A1 * | 1/2002 | Snygg et al. ............ 455/126 |

FOREIGN PATENT DOCUMENTS

| WO | 0193438 A1 | 12/2001 |
| WO | 0193444 A1 | 12/2001 |

OTHER PUBLICATIONS

Widdowson, T; et al "Uplink and Downlink Experimental CDMA Overlay of GSM Network in Fading Environment" Electronics Letters, IEE Stevenage, GB, vol. 35, No. 17, Aug. 19, 1999, pp. 1440-1441.

Yamaguchi, H "Active Interference Cancellation Technique for MB-OFDM Cognitive Radio" 34th European Microwave Conference, 2004. Amsterdam, The Netherlands. Oct. 13, 2004, pp. 1105-1108.

* cited by examiner

*Primary Examiner* — Thanh Le

(57) ABSTRACT

A UWB or other transmitter reduces interference to a narrow-band victim receiver on a periodic basis by means of a frequency swept notch. The notch may be created using active interference cancellation signal processing or simple deletion of sub-carriers. Details are given of both methods.

13 Claims, 5 Drawing Sheets

128 pt IFFT, 100 QPSK DATA TONES, 12 PILOTS

SWEPT NOTCH ULTRA WIDE BAND (UWB) TRANSMITTER

The present invention relates to radio signals, radio transmitters and radio receivers, particularly those using multicarrier or OFDM (Orthogonal Frequency Division Multiplex) technology.

A block diagram of a known ultra-wideband transmission system is shown in FIG. 1. Input data is processed in turn by a scrambler 101, a convolutional encoder 103 followed by a puncturer 105, and by a bit interleaver 107. Constellation mapping is then performed (block 109), followed by an IFFT operation 111 in which pilots tones and CP (Cyclic Prefix) and GI (Guard Interval) information is inserted. The resulting digital samples are converted to an analog signal using a digital to analog converter and upconverted by a combination of a mixer 115 and an interleaving kernel 117. The interleaving kernel is essentially a very fast frequency hopping local oscillator generator. The resulting upconverted signal is transmitted via an antenna 119.

In the system of FIG. 1, the mapping of OFDM sub-carriers shown in FIG. 2 may be used.

UWB transmission systems have been discussed in the literature that have reduced emissions at certain frequencies to avoid impacting known victim services that may be operating in close proximity. Such schemes have been described as "Detect and Avoid" schemes since these are intended to detect a victim service and then avoid it. OFDM signalling is well-suited to creation of such dynamic detection and avoidance since the appropriate hardware is already available for spectrum sculpting in the transmitter (using an IFFT) and spectrum analysis in the receiver (using an FFT). Furthermore, signal processing for active interference cancellation (AIC) using one or more pairs of nulling tones at the left and right edges of the desired milling band has recently been described, resulting in deep notches of 30-40 dB.

The main disadvantage of the current art is that the frequency band of a local victim receiver cannot usually be known a priori. Thus, the UWB transmitter may increase the unwanted signal (interference+noise) floor of the local victim receiver, preventing it from correctly receiving a distant, weak signal from a base station. Discovery of the local receiver may only be possible if the associated transmitter begins to transmit; but this event is unlikely to occur if the receiver remains blocked by the UWB transmission. Therefore, start-up of the local victim transmitter may be blocked until a silence period of sufficient duration occurs in the UWB transmission. It has been proposed to insert a regular silence period in the Medium Access Controller (MAC) of the UWB system to facilitate the start-up of victim services. However, initial estimates showed that the length end frequency of these silence periods would be highly onerous for the UWB device, consisting of approximately 50 ms contiguous silence with a frequency of 1 Hz or more. This manner of operation would virtually destroy any chance of maintaining an isochronous connection with sufficiently low latency.

The current invention uses a frequency domain technique to ensure the appropriate silence periods for the victim service without directly allocating any time-domain MAC resources. In an exemplary embodiment, a sub-set of the transmitted sub-carriers are nulled, and the location of the null is not static but is swept in a systematic way through a set of possible locations in the transmission band where a victim service may be located. Thus, from the point of view of the victim receiver, the interference associated with the UWB transmitter is removed for a regular, predicable duration corresponding to a regular, repeated interval when the notch is co-channel in the frequency domain with the victim service.

The present invention may be further understood from the following description in conjunction with the appended drawing. In the drawing.

Figure 1:
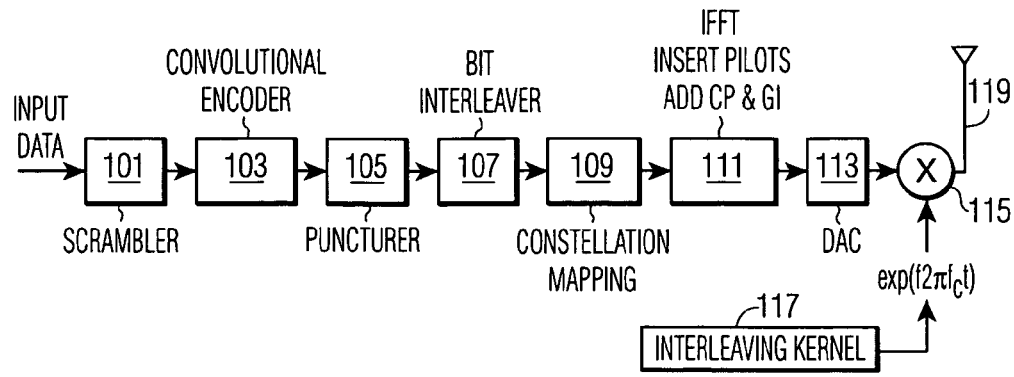
FIG. 1 is a block-diagram of a known UWB transmission system.
Figure 2:
FIG. 2 is a diagram illustrating mapping of the OFDM sub-carriers in the system of FIG. 1.
Figure 3:
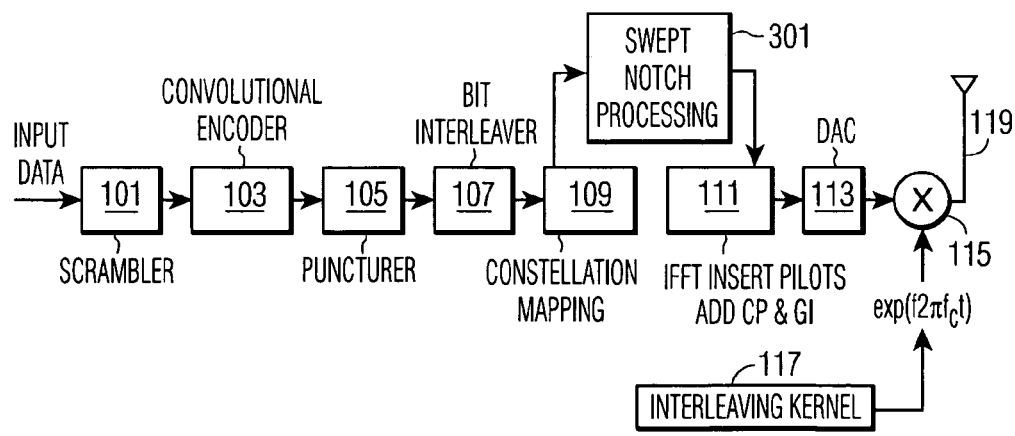
FIG. 3 is a block diagram of a swept notch UWB transmission system.

Consider an OFDM transmitter according to the block diagram schematic of FIG. 3. The transmit chain of FIG. 3 differs from that of FIG. 1 in that a swept notch processing block 301 is coupled between the constellation mapping block 109 and the IFFT block 111. Operation of the swept notch processing block 301 will be described presently. One realization of the swept notch processing block 301 is described in further detail below in connection with FIG. 11.

Figure 4:
FIG. 4 is a diagram illustrating mapping of the OFDM sub-carriers at a particular time in the system of FIG. 3.

By way of an example embodiment, consider the case where deleting four consecutive sub-carriers create a null zone of 4×4.125=16.5 MHz as shown in FIG. 4.

Figure 5:
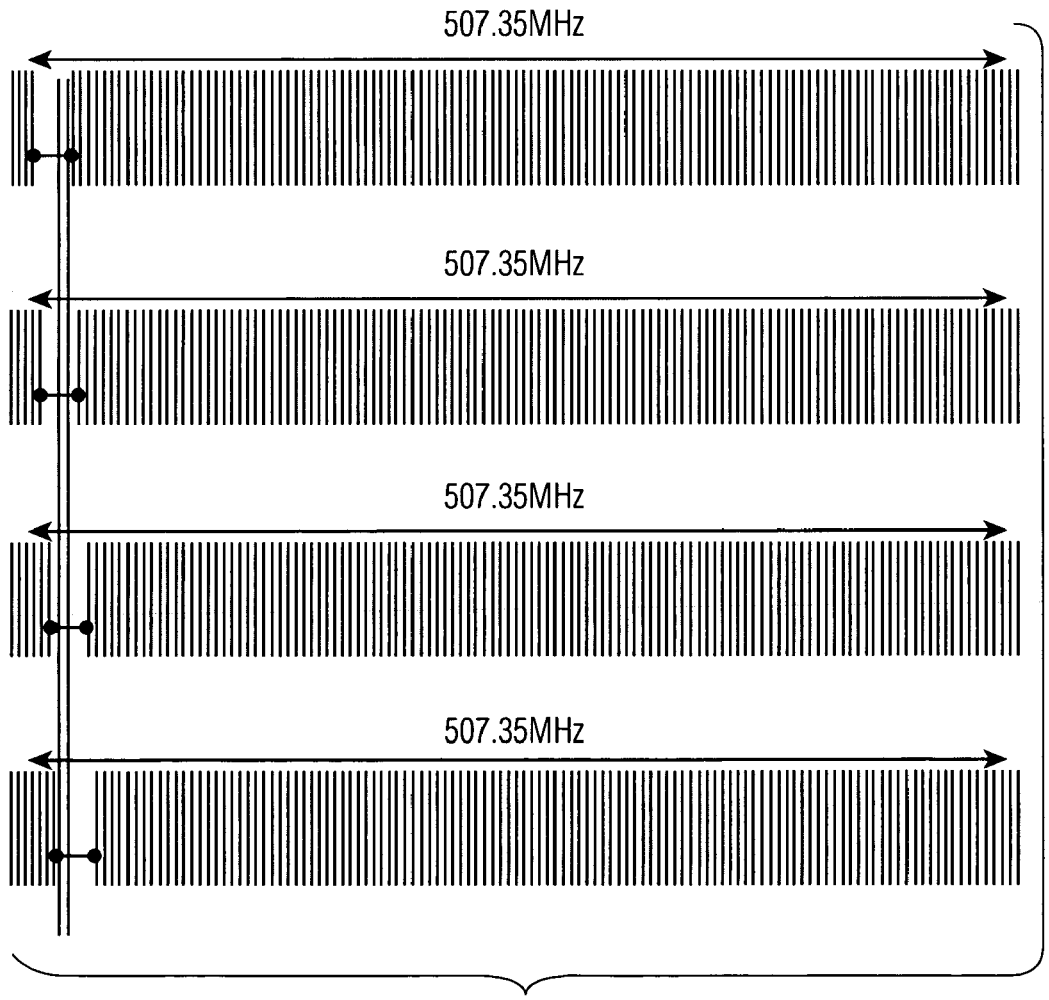
FIG. 5 is a diagram illustrating mapping of the OFDM sub-carriers over time in the system of FIG. 3.
Figure 6:
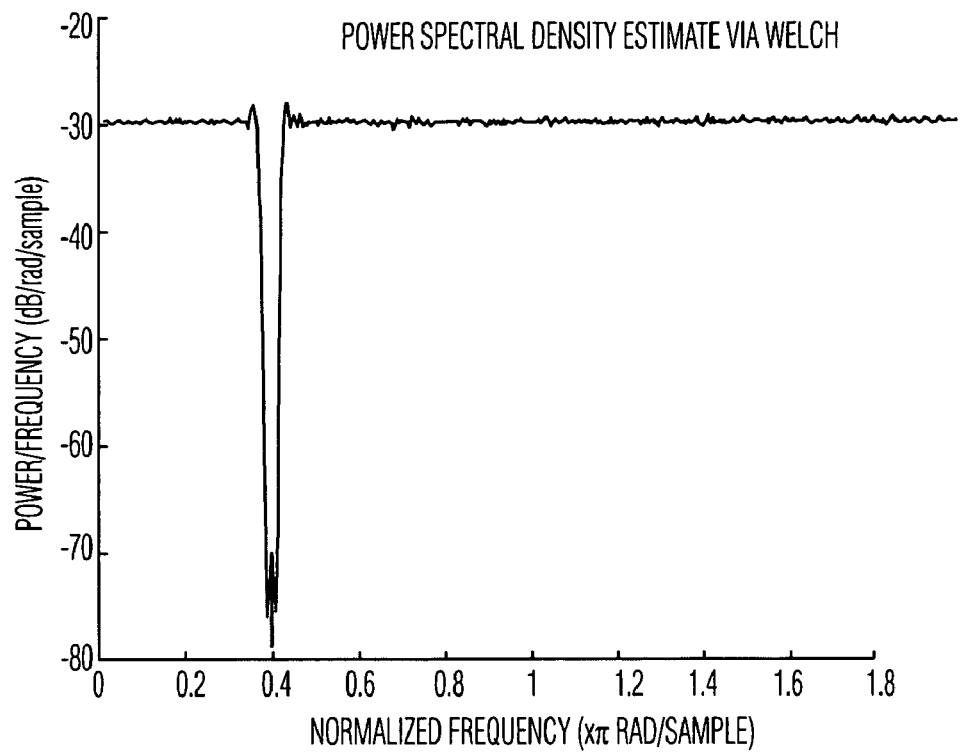
FIG. 6 is a power spectral density plot of the transmitter of FIG. 3 during a first time interval.
Figure 7:
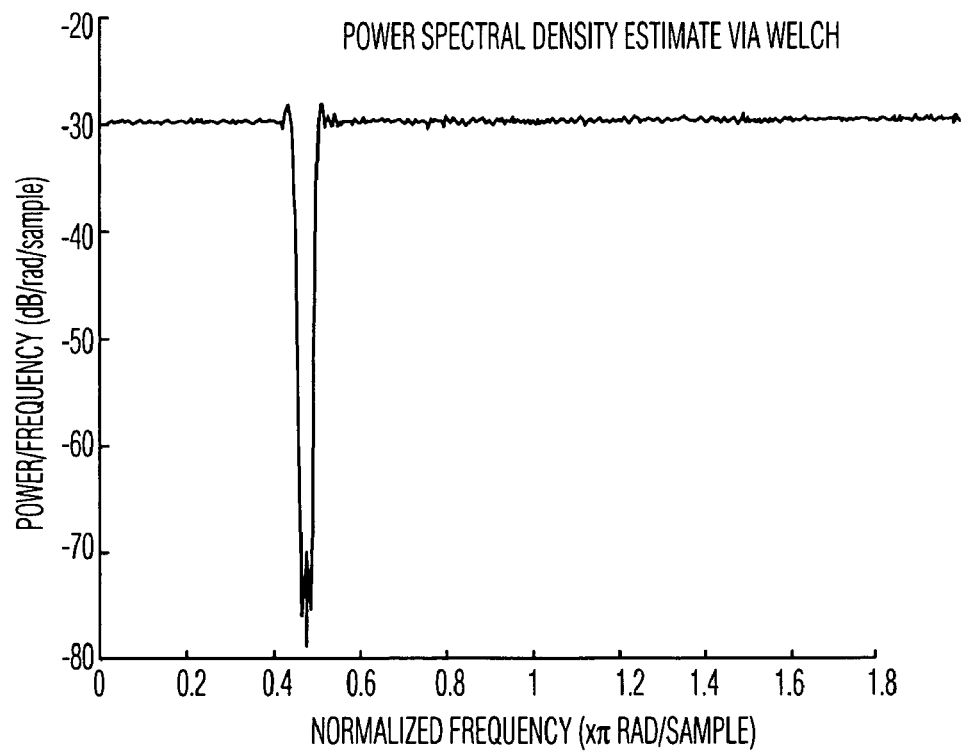
FIG. 7 is a power spectral density plot of the transmitter of FIG. 3 during a second time interval.
Figure 8:
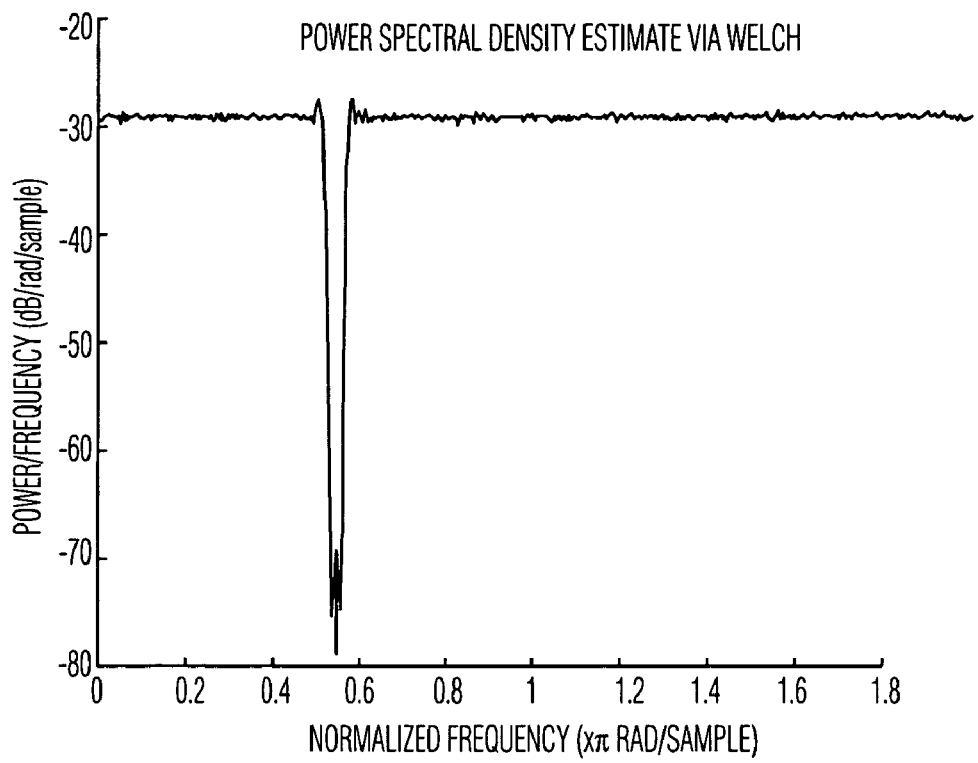
FIG. 8 is a power spectral density plot of the transmitter of FIG. 3 during a third time interval.
Figure 9:
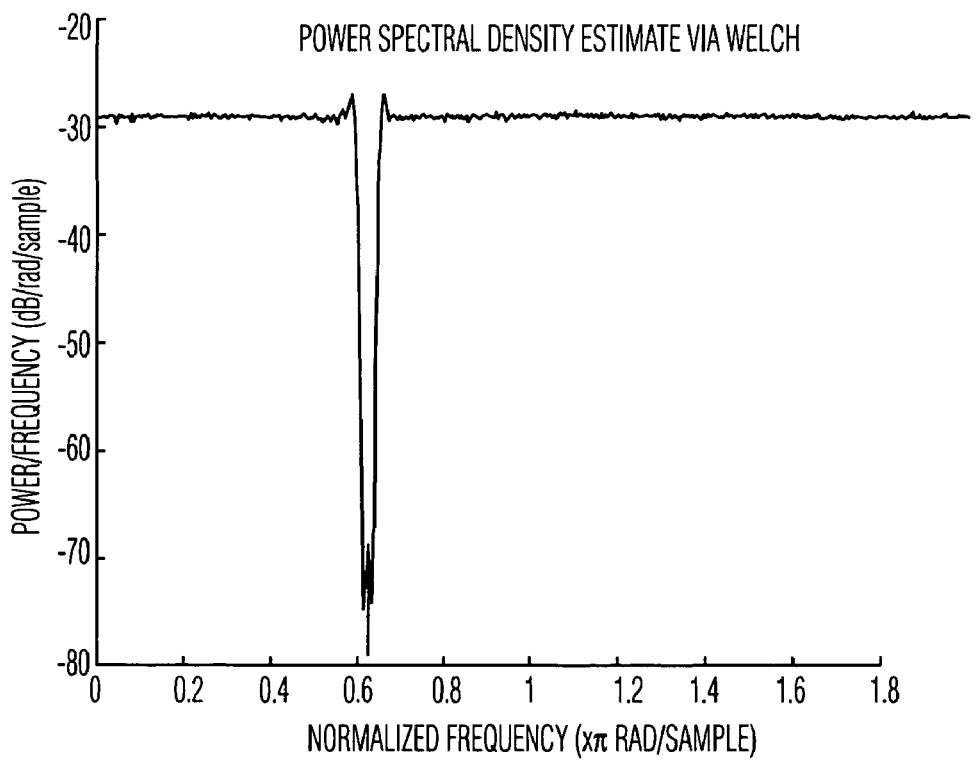
FIG. 9 is a power spectral density plot of the transmitter of FIG. 3 during a fourth time interval.
Figure 10:
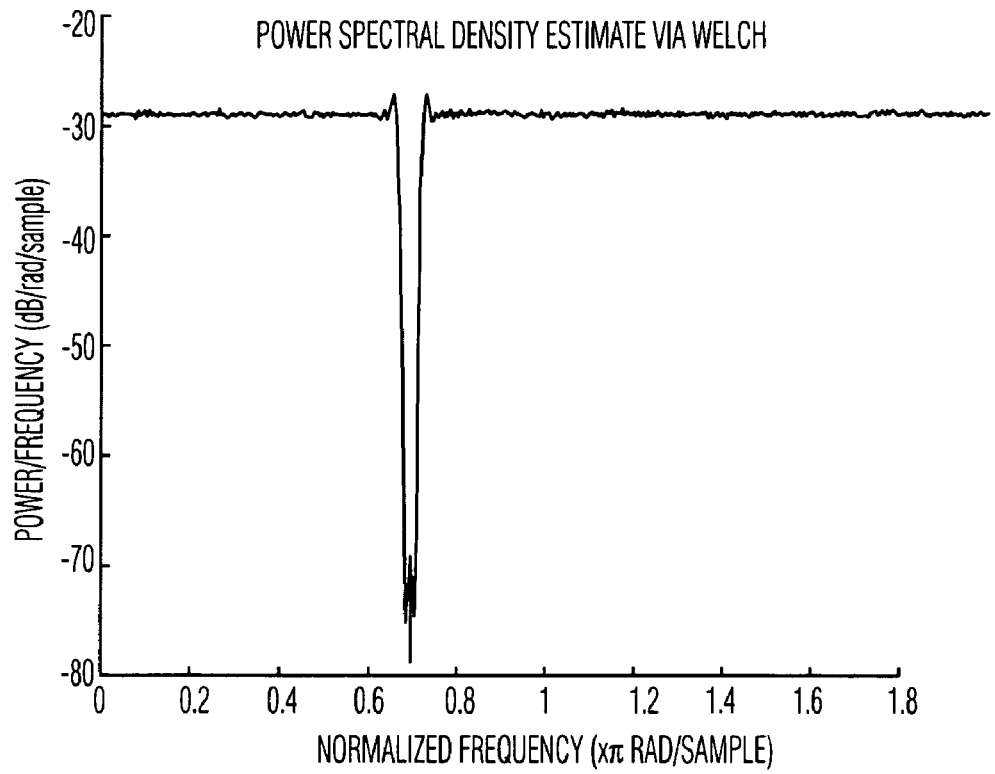
FIG. 10 is a power spectral density plot of the transmitter of FIG. 3 during a fifth time interval.

Initially, the four leftmost tones are removed by inserting null values in the corresponding IFFT register locations in the transmitter. This situation is maintained for a pre-determined period of time. In subsequent time-slots, the location of the notch is shifted by one sub-carrier location. This shifting is illustrated in FIG. 5.

An exemplary time interval between shifts of the notch could be 20 ms. This would low a service that could be protected by the deletion of two sub-carriers to be protected for a period of 60 ms. Assuming the cycle would be extended of 128 sub-carriers, the period between protection intervals would be 128×20 ms=2.56 seconds. This may be satisfactory from the point of view of a victim service starting up for the first time, since after power-on of a device, the user may accept several seconds to acquire service and establish a connection. Once uplink communication has commenced from the device receiving protection, a fixed notch may be substituted for the swept one in order to protect location of the victim service downlink signal. This protection may be based on a known duplex spacing, or limited set of possible duplex spacings known to be employed by the service receiving protection.

A second exemplary embodiment relates to the case where active interference cancellation is employed. (See *Active interference cancellation technique for MB-OFDM cognitive radio* Yamaguchi, H.; Microwave Conference, 2004. 34th European Volume 2, 13 Oct. 2004 Page(s): 1105-1108)

In the above-cited work, it is shown that deep notches can be created by use of active interference cancelling tones, typically located at the edges of the region to be nulled. Without reproducing the entire mathematical basis, the essential notation is as follows:

The upsampled frequency domain vector, Y, can be calculated from the following matrix product:

$$Y[512,1]=P[512,128] \cdot X[128,1]$$

A segment of Y to be nulled is defined as $d_1$.

$$d_1[n_u,1]=P_2[n_u,128] \cdot X_1[128,1], \text{ where } X_1[128,1]$$

is the vector of transmitted OFDM tones with a contiguous segment of length $n_{null}-n_{aic}$ set to zero. $n_u=4(n_{null}-n_{aic}-1)+1$; $n_{aic}$ is the number of AIC tones.

To minimized: $\|P_1[n_u, n_d] \cdot h[n_d, 1] + d_1[n_u, 1]\|^2$ $$\Rightarrow h = -(P_1^T P_1)^{-1} P_1^T d_1 \text{ Moore-Penrose psuedo inverse}$$
$$= -W_1 d_1$$
$$= -W_1(P_2 \cdot X_1)$$
$$= -W_2 \cdot X_1$$

In the above equations, $P_1$ and $P_2$ are sub-matrices of the transform kernel, P, used to perform frequency-domain upsampling, h is a vector of active interference cancellation values to be inserted and $X_1$ is the vector of information symbols to be transmitted but with the locations where active interference cancellation vector h will be inserted replaced by zeros. The value of matrix $W_2$ is fixed for any given desired notch and can be pre-calculated.

It has been noted that the "nulling matrix" $W_2$ typically has only $n_{aic}$ significant rows, where $n_{aic}$ is the number of active interference tones used (typically 2). Taking account of this, a pair of vector dot products, one for each active interference cancellation tone employed, can replace the matrix multiplication $h=-W_2 X_1$.

Note that a given notch can be moved to any desired location by a corresponding cyclic shift of the matrix $W_2$. In the context of the current invention, this is useful because it allows an active interference cancellation notch to be moved using low complexity operations, namely a cyclic shift by one or more locations. Thus, a regular, timed cyclic shift of the notch location can be accomplished very easily.

Figure 11:
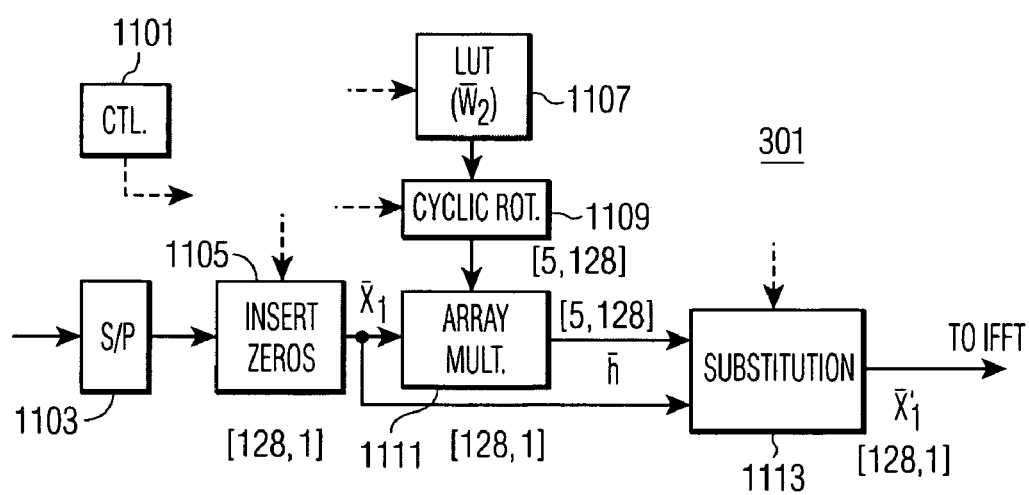
FIG. 11 is a block diagram of the swept notch processing block of FIG. 3.

Referring to FIG. 11, a block diagram is shown of the swept notch processing block of FIG. 3 for producing a cyclically shifted AIC notch in the foregoing manner. A control circuit 1101 controls operation of the various blocks of FIG. 11.

The size of the IFFT in the present example is assumed to be 128. In preparation for the IFFT, a [128,1]-sized array of information symbols is formed using a conversion circuit 1103. A block 1105 then performs an operation in which zeros are inserted in place of values for sub-carriers to be nulled, thereby forming a "notched OFDM symbol" $X_1$. At the same time, a nulling matrix $W_2$ selected in view of a desired notch width (assumed hereto be five sub-carriers) is read out of a look-up table 1107. The nulling, matrix is cyclically rotated by a circuit 1109 in accordance with a current desired position of the narrowband notch. The notched OFDM symbol and the rotated nulling matrix are multiplied by a multiplier 1111 to obtain an interference cancellation vector h. In a block 1113, the values of the interference cancellation vector h are substituted for the zero values of the notched OFDM symbol to produce an AIC OFDM symbol $X'_1$. The AIC OFDM symbol is then ready for the IFFT operation to follow.

Example MATLAB® code for a cyclically shifted AIC notch follows:

```
% Test AIC for OFDM showing cyclic shift of notch location
% 128 Random QPSK symbols are transmitted using OFDM
% A null region is created by writing zeros in required IFFT locations
% A MMSE solution is found to the set of complex tone value to replace
% the missing set for minimum energy in the desired null band.
% The resulting PSD for 1000 such OFDM symbols is plotted.
clear; close all;
nr=24:28; %null region range of sub-carriers
unr=(nr-1)*4+1; % null region indices at 4x oversampling
unr1=unr(2):unr(end-1); % this is the region for zero energy sub-carriers
P=zeros(length(unr1),128);% transform kernel for 4x oversampling
for k=0:127
    for l=unr1
        P(l+1-unr1(1),(k+1)=sum(exp(j*2*pi*(0:127)*(k-(l-1)/4)/128));
    end
end
fprintf(1,'done calculating P\n')
P1=P(:,nr); % smaller transform kernel
W1=inv(P1'*P1)*P1'; % pre-calculation of Moore-Penrose psuedo inverse
W2=W1*P;
for shift=1:5
    stream=[ ];
    for sim=1:1000
        a=(rand(1,128)>0.5)*2-1+j*((rand(1,128)>0.5)*2-1); % vector
            of 128 QPSK sub-carriers
        a(nr)=0; % this region is hereby nulled
        h=-W2*a.'; % Calculation of required nulling tone set
        b=[a(1:nr(1)-1) h.' a(nr(end)+1:128)]; % insertion of tone set
        ofdm=ifft(b); % make an OFDM symbol in time domain
        stream=[stream ofdm zeros(1,128)]; % calculate OFDM
            symbol stream
    end
    figure(shift)
    pwelch(stream,1024) % evaluate spectrum
    nr=nr+5; % shift notch location by 5 places
    W2=[W2(:,128-5+1:end) W2(:,1:128-5)]; % corresponding
        cyclic shift of W2
end
```

The last two lines of code preceding the final "end" statement are responsible for "shifting" the notch. The shift has been set to 5 IFFT bins for clarity in the graphical output. Without loss of generality, the shift, can be set to a single IFFT bin for use in a real-world scenario in order to prolong the period of interference protection for the victim service.

FIGS. 5-10 are five figures resulting from executing the above code. They represent the average power spectral density with the notch in a sequence of five locations. Note that the notches are approximately 40 dB in depth and the quality of the notch is not impacted by the cyclic shift operation used to move it to a desired location.

The described transmitter may be used with a conventional receiver unaware of the swept-notch characteristics of the received signal. Alternatively, the receiver may be arranged such that energy below a threshold level for a given carrier or sequence of carriers is "zeroed out" In this manner, noise is not mistaken for transmitted information.

The present invention finds application, for example, in ultra-wide band radio transceivers employing detect and avoid methods to protect in-band victim services, and in cognitive radio solutions in general. Note that the application of this invention is highly detectable, due to the swept notch being a highly observable phenomenon.

It will be appreciated by those of ordinary skill in the art that the present invention may be embodied in other specific forms without departing from the spirit or essential character thereof. The foregoing description is therefore considered in all respects to be illustrative and not restrictive. The scope of the invention is indicated by the appended claims, not the foregoing description, and all changes which come within the meaning and range of equivalents thereof are intended to be embraced therein.

What is claimed is:

1. A method of transmission in a wideband communications system, comprising:
    transmitting a wideband signal having a narrowband notch within which signal power is deliberately attenuated to allow for narrowband signal transmission by other devices within a band of the narrowband notch; and
    causing the narrowband notch to be swept at intervals within the band of the wideband signal.

2. The method of claim 1, comprising fixing the narrowband notch at a location within the band based on detection of an uplink narrowband signal transmission.

3. The method of claim 1, comprising using active interference cancellation whereby active interference cancelling tones within the narrowband notch are used to reduce energy contributions from tones outside the narrowband notch.

4. The method of claim 3, comprising:
    forming an array of values, each value representing information to be transmitted on a particular sub-carrier;
    for values corresponding to sub-carriers within the narrowband notch, inserting zero values into the array of values; and
    multiplying the array of values by a nulling matrix to obtain an active interference cancellation matrix.

5. The method of claim 4, comprising:
    replacing the zero values by values of the active interference cancellation matrix.

6. The method of claim 4, comprising:
    performing cyclic rotation of the nulling matrix, thereby changing a location of the narrowband notch.

7. A transmitter for use in a wideband communications system, comprising:
    means for transmitting a wideband signal having a narrowband notch within which signal power is deliberately attenuated to allow for narrowband signal transmission by other devices within a band of the narrowband notch; and
    means for causing the narrowband notch to be swept at intervals within the band of the wideband signal.

8. The transmitter of claim 7, comprising means for fixing the narrowband notch at a location within the band based on detection of an uplink narrowband signal transmission.

9. The transmitter of claim 7, comprising:
    means-for forming an array of values, each value representing information to be transmitted on a particular sub-carrier;
    means for inserting zero values into the array of values for values corresponding to sub-carriers within the narrowband notch; and
    a multiplier for multiplying the array of values by a nulling matrix to obtain an active interference cancellation matrix.

10. The transmitter of claim 9, further including circuit modules configured and arranged:
    for replacing the zero values by values of the active interference cancellation matrix.

11. The transmitter of claim 9, comprising:
    means for performing cyclic rotation of the nulling matrix, thereby changing a location of the narrowband notch.

12. A method of communicating, including reception, in a wideband communications system comprising:
    detecting a narrowband notch within which signal power is deliberately attenuated to allow for narrowband signal transmission by other devices within a band of the narrowband notch;
    setting a receiver energy signal within the narrowband notch to a predetermined low level; wherein the method further includes
    transmitting a wideband signal having the narrowband notch within which signal power is deliberately attenuated to allow for narrowband signal transmission by other devices within the band of the narrowband notch; and
    causing the narrowband notch to be swept at intervals within the band of the wideband signal.

13. A communication device, including a receiver, for use in a wideband communications system, comprising:
    means for detecting a narrowband notch within which signal power is deliberately attenuated to allow for narrowband signal transmission by other devices within a band of the narrowband notch;
    means for setting a receiver energy signal within the narrowband notch to a low predetermined level; wherein the device further includes
    means for transmitting a wideband signal having the narrowband notch within which signal power is deliberately attenuated to allow for narrowband signal transmission by other devices within the band of the narrowband notch; and
    means for causing the narrowband notch to be swept at intervals within the band of the wideband signal.

* * * * *